United States Patent Office 3,367,911
Patented Feb. 6, 1968

3,367,911
HARDENED EPOXIDE POLYMERS
Gerhard Daum, Cologne-Raderberg, Paul Janssen, Cologne, and Hermann Richtzenhain, Cologne-Sulz, Germany, assignors, by mesne assignments, to Scholven-Chemie Aktiengesellschaft, Gelsenkirchen-Buer, Germany, a corporation of Germany
No Drawing. Filed May 6, 1966, Ser. No. 548,050
Claims priority, application Germany, May 14, 1965, D 47,261
6 Claims. (Cl. 260—47)

This invention relates to hardening epoxy resins. It more particularly refers to the production of shaped bodies and surface coatings from hardened epoxy resins. It still more particularly refers to shaped bodies and surface coatings of hardened epoxy resins having improved properties.

It is well known that useful objects, including shaped articles and coated surfaces, can be made from hardened epoxy resins. These epoxy resins are generally compositions containing multiple epoxy or oxirane groupings in a single molecule. Often epoxy resins contain polyepoxide compounds admixed with diluent mono-epoxide compounds.

It is also well known that epoxy resins, whether consisting only of polyepoxides or containing both mono-epoxides and polyepoxides, can be cured into products of industrial and commercial significance which products are hard, glossy and generally very desirable. Many different types of amine curing or hardening agents are known and have been used for the general purposes expressed above.

Aliphatic amines, particularly polyamines, are known epoxy resin hardening agents. For example, lower alkylene diamines such as ethylene diamine, propylene diamine and the like have been employed as epoxy hardeners and curing agents. Aliphatic polyamines such as diethylene triamine, triethylene tetramine, dipropylene triamine and the like have also been used for this purpose.

Although aliphatic amines of this type have been used successfully on an industrial scale to harden epoxy resins, and although such hardened products have been found to have desirable properties, the use of these compounds in this application has some drawbacks and deficiencies which have made such use less than totally desirable. For example, these aliphatic amines can be used to harden epoxy resins at room temperature or other temperatures without the necessity of heating the resin-hardener mixture to produce desirable products but since the aliphatic amines are generally quite toxic, special precautions must be taken to insure that users, either industrial workers or consumers, are not deleteriously affected by he toxicity of the hardeners. Further, it would be desirable to improve the physical properties of the hardened epoxy products if possible, without detracting from their economic attractiveness.

In many applications, aromatic amines, particularly aromatic polyamines, are used in place of aliphatic amines. These compounds are exemplified by phenylene diamine, bis(aminophenyl)methane, bis(aminophenyl) sulfone, 2,6 diaminopyridine and the like. Epoxy resin-aromatic amine compositions are suitably heated to initiate the exothermic hardening and curing reaction and thus they are subject to the disadvantage of being generally useful only on an industrial scale and not generally applicable to use by the ordinary retail consumer which is a very large market.

Further, these aromatic amines are usually, or at least often, solid in their uncombined state and so must be melted or dissolved before they can be conveniently used even by industry. Thus, while these materials, aromatic polyamines, are being used and have been used successfully, it is apparent that they do not represent the utmost in desirability to this art.

Cycloaliphatic amines should, by their inherent structure, present somewhat of a hybrid between the aromatic and aliphatic amine hardeners referred to above. In particular, these materials exist in the liquid state at ordinary temperatures or have melting points very near to room temperature and so can be used with considerably less trouble, difficulty and expertise than is necessary with aromatic amines. In addition, these cycloaliphatic amines reduce the toxicity problem often encountered in using aliphatic polyamines. It is to be expected that many compounds of the cycloaliphatic polyamine class have been used as curing and hardening agents for epoxy resins in general. Exemplary of these known useful cycloaliphatic polyamine hardening agents is 1,8 diamino-p-menthane which is representative of these materials.

Even with the advent and use of these cycloaliphatic amine curing agents for epoxy resins, the ultimate in end product physical properties has not been reached. Thus it is still desirable to produce a hardened epoxy shaped article or coating material having improved physical properties over that which is presently available.

It is therefor an object of this invention to provide an improved hardened epoxy resin.

It is another object of this invention to provide a novel hardening material for use with epoxy resins.

It is a further object of this invention to provide shaped articles and coating of hardened epoxy resin having improved properties.

Other and additional objects of this invention will become apparent from a consideration of this entire specification, including the claims appended hereto.

In accord with and fulfilling these objects, this invention resides, in one of its aspects, in the use of 3,5,5-trimethyl-3-aminomethyl cyclohexylamine as the curing and hardening agent for polyepoxide resins. This material, 3,5,5 - trimethyl - 3 - aminomethyl cyclohexylamine, has many attributes which recommend its use in this application. It is liquid at room temperatures and does not tend to crystallize. It is readily miscible with most if not all epoxy resin compositions to produce mixtures which have a relatively low viscosity. More important however is the fact that epoxy resins hardened and cured using this particular hardener have superior electrical, mechanical and thermal properties as compared with the same resins cured and hardened with known cycloaliphatic agents. For example, molded shaped articles produced using 3,5,5-trimethyl-3-aminomethyl cyclohexylamine as the hardening and curing agent have higher tensile strength, greater bending strength, and higher impact strength than do epoxy resins which utilize other cycloaliphatic curing agents. Similarly, surface coating films prepared from epoxy resin cured and hardened with this material have shorter hardening time, higher pendulum hardness, greater luster, better leveling and less surface tackiness than are exhibited by the same epoxy resins cured with other cycloaliphatic hardening and curing agents which are known.

Substantially any of the polyepoxide compounds can be used as the resin to be cured according to this invention. Such materials can be generally described as aliphatic, alkaryl or cycloaliphatic hydrocarbon or hetero-atom containing hydrocarbon molecules which contain an oxirane or alkylene oxide constituent. Exemplary of these compounds are the epoxides of vinyl cyclohexene; dicyclopentadiene; cyclohexadiene; cyclooctadiene; cyclododecadiene; cyclododecatri and tetraene; isoprene; butadiene; divinyl benzene; 1,5-hexadiene; alkyl substituted divinyl benzene; polybutadiene; allyl, vinyl and crotyl ethers of ethylene glycol, propylene glycol, butylene glycol, trimethylolpropane, trimethylolethane, anhydroenneaheptitol, pentaerythritol, sorbitol, thiodiglycols, glycerin, polyallyl alcohol, polyvinyl alcohol, diethylene and dipropylene glycols; allyl, vinyl and crotyl ethers of polyhydric phenols such as resorcinol, catechol, hydroquinone,
bis(4-hydroxyphenyl)methane,
bis(4-hydroxymethylphenyl)methane,
bis(4-hydroxy-3,5-dichlorophenyl)methane,
bis(4-hydroxy-3,5-dibromophenyl)methane,
bis(4-hydroxy-3,5-difluorophenyl)methane,
1,1, bis(4-hydroxyphenyl)ethane,
2,2 bis(4-hydroxyphenyl)propane,
2,2, bis(4-hydroxy-3-methylphenyl)propane,
2,2 bis(4-hydroxy-3-chlorophenyl)propane,
2,2 bis(4-hydroxy-3,5-dichlorophenyl)propane,
bis(4-hydroxyphenyl)phenyl methane,
bis(4-hydroxyphenyl)diphenyl methane,
bis(4-hydroxyphenyl)-4'-methylphenyl methane,
1,1 bis(4-hydroxyphenyl)-2,2,2-trichloroethane,
bis(4-hydroxyphenyl)-4'-chlorophenyl methane,
1,1 bis(4-hydroxyphenyl)cyclohexane,
bis(4-hydroxyphenyl)cyclohexyl methane,
4,4'-dihydroxydiphenyl,
2,2'-dihydroxydiphenyl,
4,4'-dihydroxydiphenyl sulfone, hydroxy alkylene phenols; allyl, vinyl and crotyl secondary and tertiary amino and thio-compounds such as diallyl amine, dicrotyl methyl amine, N,N diallylaniline, N,N'-dimethyl, diallyl-bis(4 amino phenyl)methane, diallyl thioether; allyl, vinyl and crotyl esters of unsaturated carboxylic acids or diesters of saturated or unsaturated dibasic carboxylic acids such as diallyl adipate, allyl cyanurate, allyl methyl maleate or itaconate, diallyl succinate, or the like; polyunsaturated acids or esters such as linseed oil, linoleic acid, linolenic acid, Diels-Alder condensation products of maleic acid or anhydride and butadiene, cyclohexenyl cyclohexene carboxylate and the like; thio compounds such as diallyl sulfide, sulfone or sulfoxide, trimethylene trisulfone; and other similar compounds, oligomers of epichlorohydrin.

It is, of course, understood that these above recited and similar compounds may be utilized as the epoxy resin in this invention either alone or in admixture with each other. In addition, these compounds or mixtures thereof may be used in admixture with epoxy reacting diluents such as, for example, carbonyl compounds such as aldehydes and/or ketone and/or monoepoxides. Exemplary of this latter group of compounds are alkylene mono oxides such as propylene, or butylene oxide, cycloalkylene oxides such as cyclohexene and cyclopentene oxide and aryl alkylene oxides such as styrene oxide; alkylene oxides containing hetero atom linkages such as epichlorohydrin, glycidyl ethers of alkanols such as methanol, ethanol, propanol, butanol, hexanol, 2 ethylhexanol dodecanol and the like; glycidyl ethers of monohydric phenols such as phenol, cresol, xylenol and the like; glycidyl esters of saturated monocarboxylic acids such as acetic, propionic, butyric, lauric, stearic; acetals of glycidaldehyde or epoxycrotonaldehyde with saturated alcohols such as those set forth above; ketones such as acetone, methylethyl ketone, methyl isobutyl ketone, etc.; and aldehydes such as butyraldehyde, etc.

It is within the spirit and scope of this invention to include in the epoxy composition hereof any or all of the materials which are conventionally included in such compositions including dyes, pigments, fillers, solvents, plasticizers, hardening accelerators and the like. Of particular importance are the hardening accelerators since these materials tend to shorten the time necessary for a shaped article or a surface coating to set up, cure and harden. Exemplary of the materials which can be used for this purpose are mono and polyhydric phenols such as phenol, resorcinol, cresol, aminophenol and the like; mono and polyhydric alcohols such as isopropanol and 1,3 butylene glycol; mercapto compounds such as phenyl mercaptan; thio ethers such as phenylethyl thioether; dithio ethers; dialkyl sulfoxides; thiocyanates; isothiocyanates and sulfones.

It has been found convenient and expedient to harden epoxy resins according to this invention at temperatures of about 20 to 200° C., preferably at about room temperature. The particular temperature chosen for curing is somewhat dependent upon the particular composition being cured. Thus it is dependent upon the particular epoxy resin or combination of resins chosen for hardening as well as the content of "foreign" material, e.g., filler in the composition. It is practical in accord with this invention to provide hardening in sequential operations. Thus an epoxy resin can be initially hardened at a low temperature, e.g., room temperature, and thereafter subjected to a post hardening treatment at a higher temperature, e.g., 100° C.

It is preferred in the practice of this invention to use the hardener in proportion of about one available aminohydrogen atom per epoxide group in the resin molecule. It is, of course, within the spirit and scope of this invention to utilize more or less of the hardener in order to provide a final hardened product having a greater or lesser degree of crosslinking respectively.

It is within the spirit and scope of this invention to use a combination of amine hardeners provided that one of such amines is 3,5,5-trimethyl-3-aminomethyl cyclohexyl amine. It is preferred to use this particular amine as the major constituent of the hardener composition.

The following examples are given by way of illustration of the instant invention and are not to be construed as limiting thereon.

*Examples 1 to 4*

Moldings were produced from molding compositions which consisted of 100 grams of a commercial epoxy resin having a base of Bisphenol-A and epichlorhydrin with an epoxy value of 0.53 per 100 grams of resin and a stoichiometric quantity of the following hardeners:

*Example 1.*—23 grams of 3,5,5-trimethyl-3-aminomethylcyclohexylamine,

*Example 2.*—27 grams of a cycloaliphatic polyamine which is available on the market under the name Laromin C 252 (commercial product of the BASF, Ludwigshafen),

*Example 3.*—32 grams of a cycloaliphatic polyamine, available on the market under the name Laromin C 260 (commercial product of the BASF, Ludwigshafen), and

*Example 4.*—22 grams of 1,8-diamino-p-menthane. The test bodies were hardened for 24 hours at 70° C.

The mechanical properties were determined as set forth in the following table:

TABLE 1.—PRODUCTION OF SHAPED BODIES

| Mechanical and physical properties | Examples | | | |
|---|---|---|---|---|
| | 1 | 2 | 3 | 4 |
| Tensile strength (kg./cm.$^2$) | 902 | 661 | 687 | 588 |
| Bending strength (kg./cm.$^2$) | 1,161 | 1,113 | 909 | 1,156 |
| Impact strength (cm.kg./cm.$^2$) | 22.7 | 13.4 | 19.9 | 14.9 |
| Ball indentation hardness kg./cm$^2$) | 1,384/1,326 | 1,179/1,131 | 1,326/1,273 | 1,482/1,447 |
| Vicat (° C.) | 147–149 | 107–109 | 136–145 | |
| Martens (° C.) | 97–100 | 84–85 | 97–98 | 101–104 |
| Tracking resistance | T 5 | T 5 | T 5 | T 4–5 |

Examples 5 to 8

Coatings were prepared from coating compositions which consisted of 90 weight percent of a condensation product of Bisphenol-A and epichlorhydrin having an epoxy equivalent of 0.53/100 grams of resin and 10 weight percent of 2-ethylhexylglycidether. 100 grams of this diluted epoxy resin were treated with 25 grams of TiO$_2$ and 2 grams of Bentone 27 (a commercial product of the Titangesellschaft of Leverkusen). To each 127 grams of this mixture, there were added the hardeners indicated below, in the amount indicated, as well as 6 grams of a catalyst solution consisting of 88 grams of isopropanol and 12 grams of guanidine rhodanide, whereupon the resultant mixture was applied to slabs of glass and deep-drawn plates in layer thicknesses of 100μ at room temperature.

*Example 5.*—23 grams of 3,5,5-trimethyl-3-aminomethylcyclohexylamine,

*Example 6.*—28 grams of a cycloaliphatic polyamine which is available on the market under the name Laromin C 252 (commercial product of the BASF, Ludwigshafen),

*Example 7.*—32 grams of a cycloaliphatic polyamine which is available on the market under the name Laromin C 260 (commercial product of the BASF, Ludwigshafen), and

*Example 8.*—22 grams of 1,8-diamino-p-menthane.

The properties of the coatings obtained are set forth in Table 2 below:

with the invention gain only insignificantly in weight upon lengthy storage in gasoline, fuel oil, benzene, xylene, butanol, carbon tetrachloride, perchlorethylene or 40 weight percent sodium hydroxide solution.

What is claimed is:

1. In a hardened epoxy resin composition, wherein said resin contains a major proportion of at least one compound containing at least two oxirane linkages therein, with an amine hardening agent; the improvement which comprises providing as at least the major constituent of said hardening agent 3,5,5-trimethyl-3-aminomethyl cyclohexylamine.

2. The improved product claimed in claim 1, wherein said epoxy resin is substantially all polyepoxide.

3. The improved product claimed in claim 1, wherein said epoxy resin is a mixture of monoepoxide and polyepoxide.

4. The improved product claimed in claim 1, wherein said hardener consists essentially of said 3,5,5-trimethyl-3-aminomethyl cyclohexylamine.

5. The process of producing the improved product claimed in claim 1, which comprises admixing an epoxy resin containing at least a major proportion of polyepoxide with a hardening agent containing at least a major proportion of 3,5,5-trimethyl-3-aminomethyl cyclohexylamine and curing said resin at a temperature of about 20 to 200° C.

6. Process claimed in claim 5, wherein a hardening

TABLE 2.—PRODUCTION OF COATINGS

| Properties | Examples | | | |
|---|---|---|---|---|
| | 5 | 6 | 7 | 8 |
| Viscosity (without accelerator solution) at 25° C. (in cP): | | | | |
| After 5' | 1,000 | 225 | 1,050 | |
| After 10' | 1,050 | 245 | 1,080 | |
| After 20' | 1,120 | 280 | 1,150 | |
| Hardening time (hrs.) at 20° C. | 7 | 7 | 7.5 | >K2.4 |
| Pendulum hardness (according to Konig) (sec.): | | | | |
| After 24 hrs. at 20° C. | 60 | 45 | 62 | |
| After 7 days at 20° C. | 187 | 155 | 193 | |
| After 30 min. at 150° C. | 193 | 161 | 192 | 189 |
| Luster (according to Dr. Lange) (Percent): | | | | |
| After 24 hours at 20° C. | 100 | 68 | 62 | |
| After 7 days at 20° C. | 100 | 62 | 66 | |
| After 30 min. at 150° C. | 100 | 58 | 89 | 100 |
| Erichsen cupping (mm.): | | | | |
| After 8 days at 20° C. | 1.1 | 0.9 | 0.9 | |
| After 30 min. at 150° C. | 6.1 | 1.9 | 1.6 | 0.5 |
| Surface tack | None | Strong | Slight | (¹) |
| Leveling | Excellent | (²) | Good | Good |

¹ Not hardened.
² Surface disturbances.

The comparisons of Tables 1 and 2 clearly show that 3,5,5-trimethyl - 3 - aminomethyl - cyclohexylamine has substantially better properties than the known cycloaliphatic polyamines used for comparison.

The products hardened in accordance with the invention are characterized not only by the advantages already pointed out, but also by excellent resistance to chemicals. Thus, for instance, shaped bodies produced in accordance accelerator is admixed with said resin and said hardening agent.

No references cited.

WILLIAM H. SHORT, *Primary Examiner.*

T. D. KERWIN, *Assistant Examiner.*

UNITED STATES PATENT OFFICE
CERTIFICATE OF CORRECTION

Patent No. 3,367,911                    February 6, 1968

Gerhard Daum et al.

It is certified that error appears in the above identified patent and that said Letters Patent are hereby corrected as shown below:

Column 5, TABLE 2, fifth column, line 4 thereof, ">K 2.4" should read -- > 2.4 --.

Signed and sealed this 11th day of November 1969.

(SEAL)
Attest:

Edward M. Fletcher, Jr.                    WILLIAM E. SCHUYLER, JR.
Attesting Officer                               Commissioner of Patents